April 30, 1946.　　R. F. WARREN, JR　　2,399,526
NUT LOCK
Filed March 15, 1944
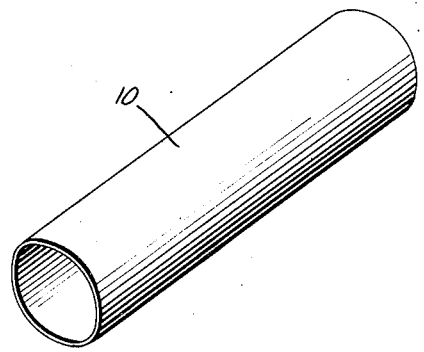
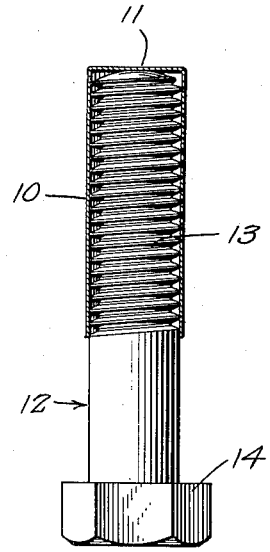
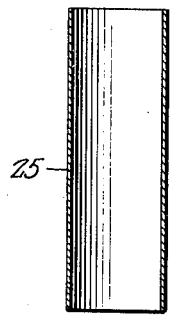
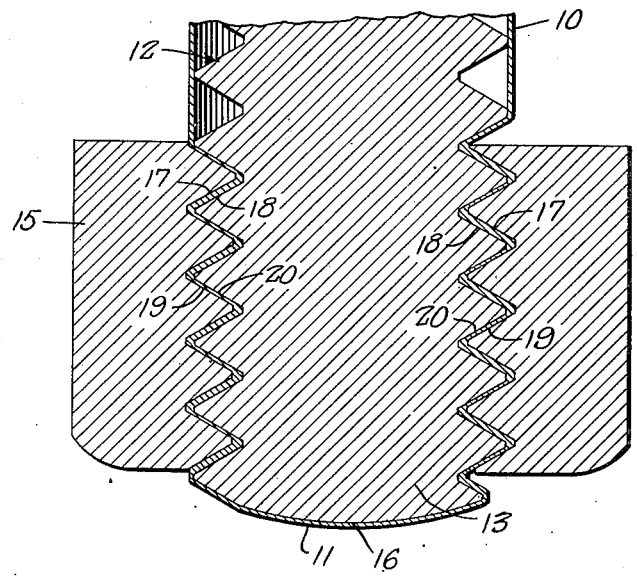
Inventor
Richard F. Warren, Jr.
By John H. Hanrahan
Attorney Patented Apr. 30, 1946

2,399,526

UNITED STATES PATENT OFFICE 2,399,526

NUT LOCK

Richard F. Warren, Jr., Stratford, Conn.

Application March 15, 1944, Serial No. 526,542

2 Claims. (Cl. 151—14)

This invention relates to new and useful improvements in means for locking together threaded elements or devices and has particular relation to a means for locking a nut onto a bolt.

An object of the invention is to provide a means which may readily, in the field and without tools of any kind, be applied to an ordinary bolt to lock to said bolt an ordinary nut as the latter is screwed onto the bolt.

Other objects and advantages will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawing:

Fig. 1 is a perspective view showing the locking means of the invention;

Fig. 2 is a vertical central sectional view through the locking means positioned on a bolt;

Fig. 3 is a vertical sectional view showing a slight modification; and

Fig. 4 is a greatly enlarged vertical sectional view showing a nut locked to a bolt in accordance with the invention.

Referring in detail to the drawing and at first more particularly to Figs. 1, 2 and 4 at 10 is generally indicated the locking means of the invention and the same comprises a thin walled cylinder of a tough flexible plastic material. Preferably the cylinder 10 includes one end wall 11. These cylinders are made up in a variety of diameters and lengths and in any particular instance the cylinder used is chosen to fit quite snugly on the bolt being used.

The proper size of cylinder having been chosen it is disposed over the bolt as shown in Fig. 2 wherein the bolt is designated 12 and is of any or the usual construction including a threaded shank 13 over the free end of which the cylinder is applied. Bolt 12 has a head 14. In addition to having a snug fit over the bolt shank the cylinder 10 is of such length as to cover the bolt shank to the extent that a nut is to be threaded onto such shank.

With the cylinder in place the nut 15 is screwed onto the bolt shank over the cylinder. The result is illustrated in Fig. 4. There it will be noted that the end wall 11 of the cylinder is drawn and somewhat stretched over the free end 16 of the bolt and that the material of the cylinder has been pressed into the threads of the bolt.

As the nut is threaded onto the bolt there is a tendency for the nut to feed the material of the cylinder outwardly toward the free end of the bolt. There is a squeezing action on the material of the cylinder by the threads of the nut and bolt. The result is that the material of the cylinder is packed or compressed between the outer or lower faces 17 of the threads of the nut and the inner or upper faces 18 of the threads of the bolt whereby the inner faces 19 of the nut threads are jammed against the outer faces 20 of the bolt threads with only very thin layers of the plastic between them.

The threads being somewhat blunt at their crests do not actually sever the material of the cylinder 10 but they tend to compress such material causing it to flow in an action tending to feed it toward the free end of the bolt. The result is a piling up of the material between thread faces 17 and 18 of the nut and bolt threads respectively and a tendency to jam the thread faces 19 and 20 of the nut and bolt threads respectively, against one another.

In this way the nut is locked to the bolt although there is some tendency for the plastic material of the cylinder to adhere to the parts and help lock them together. Where the nut and bolt are used in a heated place or in a place they are subjected to such vibration as to cause heating of the plastic of the cylinder such plastic will expand and more securely lock the nut and bolt together. That is the plastic material of the cylinder is thermoplastic as distinguished from thermosetting. It is here noted that the plastic material of the cylinder 10 has vibration absorbing properties and while it is thermoplastic it may contain some thermosetting material.

While the plastic cylinder serves to secure the nut and bolt together against casual separation the nut may be manually removed from the bolt by the use of a wrench. However the cylinder is not really useful a second time for the locking of a nut to a bolt. The material of which the cylinder is formed is later treated of in considerable detail but here it is noted that a hard vinyl chloride containing a minimum of plasticizer is especially suitable as it will not be completely squeezed from between the nut and bolt as the former is threaded onto the latter and is tough and elastic. However other thermoplastic materials may be used alone or in mixtures as will appear.

Fig. 3 shows a slight modification wherein the locking means comprises a cylinder 25 of a thermoplastic and preferably somewhat pliable material. This cylinder 25 is open through both ends but otherwise is of the construction (wall thickness, length, etc.) of the cylinder 10. Cylinder 25 is used in the manner set forth when considering cylinder 10 with the exception that when using cylinder 25 it may be necessary to leave a portion projecting over the free end of the bolt and to gather such projecting portion so that the nut may be passed over it after which such portion may be held until the nut is started onto the bolt.

The invention is not limited to the use of hard vinyl chloride. Other plastics may be used and as a rule the plastics have considerable vibration absorbing properties. Generally speaking the cylinders 10 and 25 comprise organic plastic materials and certain of these materials may be used alone while other may be used only in combination with one or more other materials to make a harder or a softer and/or a tougher material or mixture. For example, cellulose and its derivatives while in alpha and beta stage may be used as fillers and to toughen the material.

It is preferred that the cylinders be of material resistant to bacteria and fungus growth whereby they are not subject to decay through biochemical attack, that they have a relatively high heat softening point, that they be waterproof or substantially so and that they have a certain elasticity and fibre forming characteristics. Various combinations of the herein disclosed materials may be mixed for the purpose of imparting to the mass the desired characteristics. Many of the materials falling within the scope of the present disclosure are chemically incompatible with one another but are mechanically miscible to form a homogeneous mass which may be fabricated to provide the cylinders 10 and 25 of the invention.

Various synthetic resins may be used for the manufacture of the cylinders of the invention. Thus I may use (1) phenol-aldehydic resins, (2) amino-aldehydic resins, (3) hydroxy-carboxylic resins, (4) sulphonamide resins, (5) resins from sugar, (6) vinyl resins including resins from vinyl derivatives, (7) indene resins, and (8) lignin plastic substances. I may also use natural and synthetic lastics, cellulose and its derivatives, protein plastic substances and petroleum plastic derivatives. Fillers may be used with various of these materials and may be in the form of powders or fibres.

Certain of the materials named are too hard and brittle to be used alone for my purpose as they are likely to crack or fracture and fall from the bolt as the nut is applied. With these materials I mix other softer materials to lend resiliency and toughness to the mass. Other materials herein included are alone too soft and have too low a heat softening point for my present purpose. With these latter materials I mix other and harder materials to raise the heat softening point and to add materially to their hardness.

Among the resins under type (1) above I include resins such as phenol formaldehyde, cresol and cresylic acid, other tar acids and formaldehydes, phenol furfuraldehyde or other tar acids and other aldehydes. Under type (2) is included urea and formaldehyde resins, and aniline resins obtained by condensing aniline and formaldehyde and other anilines or amines and other aldehydes.

Under type (3) I include materials produced by the esterification of polybasic acids and polyhydric alcohols. Such materials are frequently called alkyd resins, this title including adipic acid resins obtained by the condensation of adipic acid and glycerin or by the condensation of glycerin with phthalic anhydride. Type (4) includes sulphonamide resins developed from para toluensulphonamide. The resins from sugar (type 5) above, are obtained by condensing saccharide with aldehydes and urea.

Type (6), the vinyl resins including resins from vinyl derivatives are best suited for my purpose. These include vinylidene chloride (formerly sold commercially as Venalloy but now as Saran); vinyl ester; vinyl chloride (above mentioned and having very desirable heat transfer properties); acrylic resins from vinylcarbonic acid ester; vinyl carbonic acid; vinyl benzole or polystyrol; divinyl or butadiene; vinylester or vinyl chloride; copolymerized polyvinyl chloride and polyvinyl acetate (known commercially as Vinylite); vinyl acetate; polymers of vinyl halides combined with different percentages of plasticizers (known commercially as Koroseal); the commercial material known as Vistanex (when used with other harder materials) comprising polyiso butylene polymerized with boron trifluoride and also comprising polyiso butadiene having a tacky to rubber-like structure; the commercial products known as Vinyon; Butacite; and Rezyl (comprising respectively a copolymer of polyvinyl chloride and polyvinyl acetate; a reaction product of vinyl acetate resin with butyraldehyde; and resulting from the fact that the introduction of unsaturated resinous ester of the maleate polyester type into a compound of the type ($R-CH=CH_2$) has the property of curing the latter); vinyl aceto butyrate; vinyl butyrate; the polymers of ester of acrylic acid known commercially as Plexigum; polymers of the esters of Methacrylic acids such as the polymethacrylic resin sold as Lucite; isobutyl methacrylic resins; certain plastics obtained by mixing the monomer of styrene with vinylidene chloride and ethylene glycol and maleic acid and copolymerizing the mixture; styrene and in addition thereto the resins known as polystyrene.

Resins of the indene group (type 7) include polyindene and poly-cumaron. Under type (8) I include lignin and its derivatives extracted from paper mill waste water and other sources. The lignin may be separated into various chemical components of no value to me here but also into colored gums and by various treatments into clear transparent resins useful for my present purpose. Lignin is hydrogenated with Raney nickel catalyst, in aqueous solution yielding methanol, propylcyclohexane, hydroxy propylcyclohexanes, and a colorless resin which may again be separated into alkali soluble in an alkali insoluble component. I use either of these components in the making of the cylinders disclosed.

Under the heading of natural and synthetic lastics I include balata, rubber, gutta percha and latex to be used alone or in combination with other plastics. As the synthetic lastics I mention polymerized chloroprene (of the type sold as Neoprene); the copolymers including butadiene (of the types sold as Buna and Perbunan); polymethylene polysulphide (of the type sold as THIKOL); chlorinated rubber (of the type sold as Tornesit); rubber hydrochloride (of the type sold as Pliofilm); and isomerized rubber (sold as Pliform) and any latex of these.

Under the heading of cellulose and its derivatives I include cellulose acetate; regenerated cellulose; synthetic cellulose; cellulose xanthate;

benzylcellulose; ethylcellulose; cellulose hydrate; cellulose triacetate; cellulose acetobutyrate; cellulose acetopropionate; hydrolized cellulose acetate and others of the cellulose esters and ethers. Most of these materials may be used alone and certain of them for mixing with other materials to provide a tougher mixture. Gel cellulose may also be used.

Nitrocellulose compounded with other materials of less flammable nature or of a nature to prevent flammability may be used. Halowax or the like may be used for compounding with the nitrocellulose. Other inflammable plasticizers which may be compounded with the nitrocellulose for my purposes are monophenyl phosphate, triphenyl phosphate and di(paratertiary butyl phenyl) mono 15 tertiary butyl 2 zenyl phosphate. The flammable nature of nitrocellulose may be weakened or lessened by mixing with varying proportions of cellulose acetate.

Under the heading of protein plastic substances I include casein plastic products as well as polypentamethylene sebacamide sold as Nylon and the group of compounds of which at least one is obtained by the condensation polymerization from a diamine and dibasic carboxylic acid and of which one is sold under the trade-mark Exton. Collegen plastics are also included under this heading of protein plastics. Resins from coffee are believed to fall under this heading.

The petroleum plastic derivatives include those gums or resins obtained by the oxidation or controlled polymerization of certain distillates of petroleum cracking. Those plastics falling under this heading and known as Santoresins are clear, hard, neutral products resistant to alkalis, acids, alcohol and water. Petropol is a softer type of the same material. Both may be used for my present purpose but it is preferred that Petropol be used in combination with some harder material.

All of the above named thermoplastic materials may be used alone or in combination with other materials to provide the cylinders or sleeves of the invention. However, in different locations or uses different plastics are preferably used. Some of the plastic have a higher heat softening point, others are more inert chemically, etc., and so the plastic used in any particular instance should be determined by the conditions of use. For best results the chemical environment should be taken into consideration when choosing the type of plastic used in making a locking cylinder of the invention.

The cylinders of the invention will not dry out or decay through biochemical attack while being stored and before use. When a nut is locked to a bolt in accordance with the invention there is no distortion or destruction of the threads of the nut or bolt. Therefore while the invention provides for the secure locking together of a nut and bolt the former may be manually removed from the latter and thereafter again both the nut and bolt may be used although a new locking cylinder will be required if the nut and bolt are to be again locked together. Preferably the material used in making the locking cylinder of the invention is fibre forming in character as such materials appear to do a better job of locking the nut and bolt together.

From the above it will be noted that I have provided a means of general application which may be readily applied to an ordinary bolt and that will serve to lock to said bolt an ordinary nut when screwed onto the bolt. No tools are necessary for the application of the locking cylinder of the invention and it may be applied to any bolt.

Therefore the mechanic may carry to a job only ordinary nuts and bolts and a supply of the cylinders of the invention and then securely lock the nuts on the bolts. Here it is noted that while the invention has been illustrated and described in connection with the locking of a nut to a bolt it is to be understood that it may be used for the locking together of any threaded members when they thread together in telescopic relation. While thermoplastic materials have been disclosed as preferred for my purpose it is to be understood that this does not exclude the use of thermoplastic compounds including some thermosetting materials.

Further it is to be understood that thermosetting materials mixed with fibrous materials, such as flock or the like may be used. The addition of other plastics and/or flock provided for a more flexible or resilient structure that will not shatter. Where thermosetting materials are used it is preferred that they be in the secondary stage of cure when applied to the bolt and that they be used in hot locations or in locations where they are subjected to such vibration as to cause heating of the sleeves. In such instances the materials pass to the final stage of cure while in use. A mixture of thermoplastic and thermosetting materials is satisfactory as providing some advantages of both materials. Where desired the sleeve of the invention may be sold along with and attached to the bolts to remain in place thereon against casual separation prior to the application of a nut.

Having thus set forth the nature of my invention, what I claim is:

1. Means for locking a nut on a bolt comprising a thin walled sleeve of a tough, elastic plastic material of an internal diameter to be moved into place by a longitudinal movement but have a snug fit over the threaded shank portion of the bolt, and said sleeve having a closed end adapted to engage against the free end of the bolt and limit the application of the sleeve to the bolt.

2. Means for locking a nut on a bolt comprising a thin walled sleeve of a deformable material of an internal diameter to have a snug fit over the threaded shank portion of the bolt, said sleeve having a closed end adapted to engage against the free end of the bolt and limit the application of the sleeve to the bolt, and said sleeve of a wall thickness whereby it is adapted to be pressed into the threads of a bolt on the threading of a nut onto said sleeve when the latter is on a bolt.

RICHARD F. WARREN, Jr.